United States Patent [19]

Schillo

[11] 3,919,489

[45] Nov. 11, 1975

[54] THYRISTOR CIRCUITRY FOR PROVIDING AUTOMATIC NUMBER IDENTIFICATION SERVICES

[75] Inventor: Robert Frederick Schillo, Englishtown, N.J.

[73] Assignee: Bell Telephone Laboratories, Incorporated, Murray Hill, N.J.

[22] Filed: Jan. 4, 1974

[21] Appl. No.: 430,926

[52] U.S. Cl. ........................... 179/27 G; 307/252 L

[51] Int. Cl.[2] .......................................... H04M 3/52

[58] Field of Search. 307/252 L; 179/27 FG, 27 FF, 179/17 A, 18 FH, 27 CB, 18 B

[56] References Cited

UNITED STATES PATENTS 3,510,687 5/1970 Toulemonde .................. 307/252 L 3,555,600 11/1967 Mapham ........................ 307/252 L

*Primary Examiner*—Kathleen H. Claffy

*Assistant Examiner*—C. Bartz

*Attorney, Agent, or Firm*—D. M. Duft

[57] ABSTRACT

Thyristor circuitry is disclosed for passing high voltage d.c. signals identifying a called non-working telephone directory number which number is automatically forwarded to an intercept operator. The thyristor circuitry is located on intercept connector shoes for mounting on intermediate distributing frame terminals individually associated with each non-working telephone number. Additionally, the thyristor circuitry is connected to overcome "rate effect" without the need of biasing from an external power source.

30 Claims, 6 Drawing Figures

THYRISTOR CIRCUITRY FOR PROVIDING AUTOMATIC NUMBER IDENTIFICATION SERVICES

BACKGROUND OF THE INVENTION

This invention relates to automatic telephone switching systems, and more particularly to an arrangement for providing automatic number identification services in such systems by using bistable semiconductor devices.

DESCRIPTION OF THE PRIOR ART

Typically, when a telephone user places a call to a number that is non-working or has been disconnected, the call is transferred to a telephone company intercept operator. In order to provide intercept service, the operator is forced to ask the calling subscriber for the number originally dialed and then, after retrieving relevant information concerning the number, informs the calling subscriber about the current status of that number, i.e., disconnected, number changed, etc.

The mechanization of this intercept service has been the object of increasing recent efforts because the provision of intercept service is becoming more and more costly. These efforts have mainly centered about attempts to reduce the amount of time required by an intercept operator to provide adequate service. Recently, Automatic Number Identification (ANI) systems have been connected with intercept arrangements so as to automatically provide the intercept operator with the number originally dialed and, thus, eliminate the necessity of the operator having to request the number from the calling party. An example of such an arrangement is shown in B. E. McCaffrey-H. R. Moore-D. H. Pennoyer, U.S. Pat. No. 3,426,156, Feb. 4, 1969.

McCaffrey et al. teaches an arrangement which utilizes the Automatic Number Identification (ANI) network used on originating calls on intercept calls. The McCaffrey arrangement comprises circuitry mounted on a three-conductor strap in the form of a spring clip called an intercept connector shoe. The shoe bridges the connection between the intermediate distributing frame terminals of the non-working line to be intercepted and the intermediate distributed multiple terminals of an operator intercept trunk.

In accordance with McCaffrey et al., a Zener diode is inserted in the sleeve lead of the intercept connector shoe. When the switching train of the telephone office makes connection to the terminals of a called line, busy test potential is applied to the sleeve terminal in the normal manner. If the particular line being called is non-working and, therefore, is one whose distributing frame terminals have the intercept connector shoe attached, the intercept trunk is seized and the signal-directing Zener diode of the shoe becomes conductive. The intercept trunk applies a short interval of a.c. identifying signal to its sleeve lead and this signal is continued through the conducting diode to the sleeve terminal of the intercepted line at the distributing frame. The ANI network connected to the line sleeve terminal at the distributing frame is thereupon operated to identify the directory number of the called line and this identification is automatically forwarded to the intercept operator.

The McCaffrey et al. arrangement operates with an ANI system, called ANI-B, which requires an a.c. signal, or tone, on the sleeve lead of the line to be identified in order to trigger a particular ANI number network. The number network, as described in U.S. Pat. No. 3,071,650 issued Jan. 1, 1963 to H. D. Cahill and C. G. Dagnall, Jr., decodes the a.c. signal to provide the intercept operator with the directory number of the terminals to which the intercept connector shoe is attached.

However, other ANI systems exist which employ number networks different from that described above and which do not respond to an a.c. or tone signal. One such ANI system, commonly referred to as Small Office ANI, or ANI-C and described in U.S. Pat. No. 3,243,514 to H. R. Moore and W. T. Sears, Mar. 29, 1966, uses a d.c. signal, approximately 340 volts in amplitude to trigger an ANI network comprising lamp detector networks. The Zener diode shoe taught by McCaffrey to pass an a.c. tone signal to activate an ANI-B amplifier network will not pass the d.c. signal nor operate the ANI-C lamp network.

Accordingly, it is an object of the present invention to provide a means whereby the automatic number identification arrangement using d.c. signals and lamp detector networks for decoding purposes may be used to automatically provide directory numbers to intercept operators.

An additional problem is that the physical size of the circuitry for interconnecting the ANI-C system with the intercept system must be designed so as to be mounted on a "shoe" which is attached to terminal strips on a distributing frame. Therefore, the new intercept connector shoe must comprise circuitry small enough to fit on the shoe and yet able to be turned on to pass large voltage amplitude d.c. signals for interconnecting the ANI-C arrangement with the intercept system. This problem can be solved using bistable solid state circuitry in the form of thyristors which are also known as silicon controlled rectifiers (SCR). An SCR is a three-terminal device which acts as a unidirectional switch between two terminals (anode and cathode) with the third terminal (gate) acting as a control terminal. Sufficient gate-to-cathode current flow causes the anode-cathode to turn on.

However, thyristors have the disadvantage of improperly turning on when the anode-to-cathode voltage rapidly changes and this inadvertent switching is termed "rate effect." Thus, if the rate of application of voltage causes a sufficiently large pulse of rate effect current to flow, the thyristor breaks down and conducts. Prior art arrangements overcome the "rate effect" by applying an external voltage source to the thyristor so as to reverse bias the device. Since the ANI-C shoe circuit must be designed to be fitted onto appropriate terminals on the intermediate distributing frame, no external power supply is available. Furthermore, the physical size of the shoe does not permit the addition of another terminal even if external power is available. Accordingly, it is an object of my invention to provide an intercept connector shoe circuit using thyristors arranged in a manner to overcome "rate effect" without using an external power source.

SUMMARY OF THE INVENTION

In accordance with the principles of the present invention, in one illustrative embodiment thereof, an intercept connector shoe comprising thyristor circuitry is designed to pass a d.c. signal and is connected between the immediate distributing frame terminals of an intercepted line and the terminals of the intercept trunk multiple. The particular shoe to be employed comprises two thyristors connected in series with the gate terminal of the first thyristor interconnected with the gate terminal of the second thyristor by a parallel resistor-capacitor network.

After the switching train of the telephone office makes a connection to the terminals of a called line, busy test potential is applied to its sleeve terminal in the normal manner. If the particular line being called is one whose distributing frame terminals have the intercept connector shoe attached, the intercept trunk is seized and it applies an interval of d.c. identifying signal to its sleeve lead. This signal causes the thyristors located on the interceptor shoe to become conductive, and the signal is continued through the shoe to the sleeve terminal of the intercepted line at the distributing frame. The number network connected to the line sleeve terminal at the distributing frame is thereupon operated to identify the directory number of the called line.

It is an aspect of the present invention that should a call be directed to an intercepted line while another caller is using the same intercept trunk, the line busy potential applied to the trunk by the first intercepted line is coupled through diode circuitry of the first line to cause the thyristor circuitry on the shoe associated with the second line to become conductive. This operation prevents the latter's switching train from maintaining a second connection to the intercept trunk.

It is a further aspect of the present invention that the first and second thyristor circuits have their gate circuits strapped together by an RC parallel circuit. This strapping prevents the thyristors from being turned on by rate effect current.

Accordingly, it is a feature of the present invention that the intercept connector shoe arrangement allows an ANI-C system to be used to automatically provide an intercept operator with the identification of directory numbers of incoming calls to nonworking numbers.

It is another feature of the present invention to design an intercept connector shoe comprising thyristor and diode circuitry to be of sufficient size to be mounted on an intermediate frame terminal.

Still another feature of the present invention is that the thyristor circuitry is connected such that "rate effect" does not inadvertently turn on the thyristors.

A further feature of the present invention is to steer the d.c. identifying signal from the intercept trunk to a called intercepted line by causing the switching train to set up a connection to cause only the thyristors associated with the called line to become conductive.

An additional feature is that the present invention comprises thyristor circuitry designed to pass identification signals having large voltages.

DESCRIPTION OF THE DRAWINGS

The foregoing objects, features and advantages of the invention will be more apparent from the following description of the drawings, in which.

Figure 1:
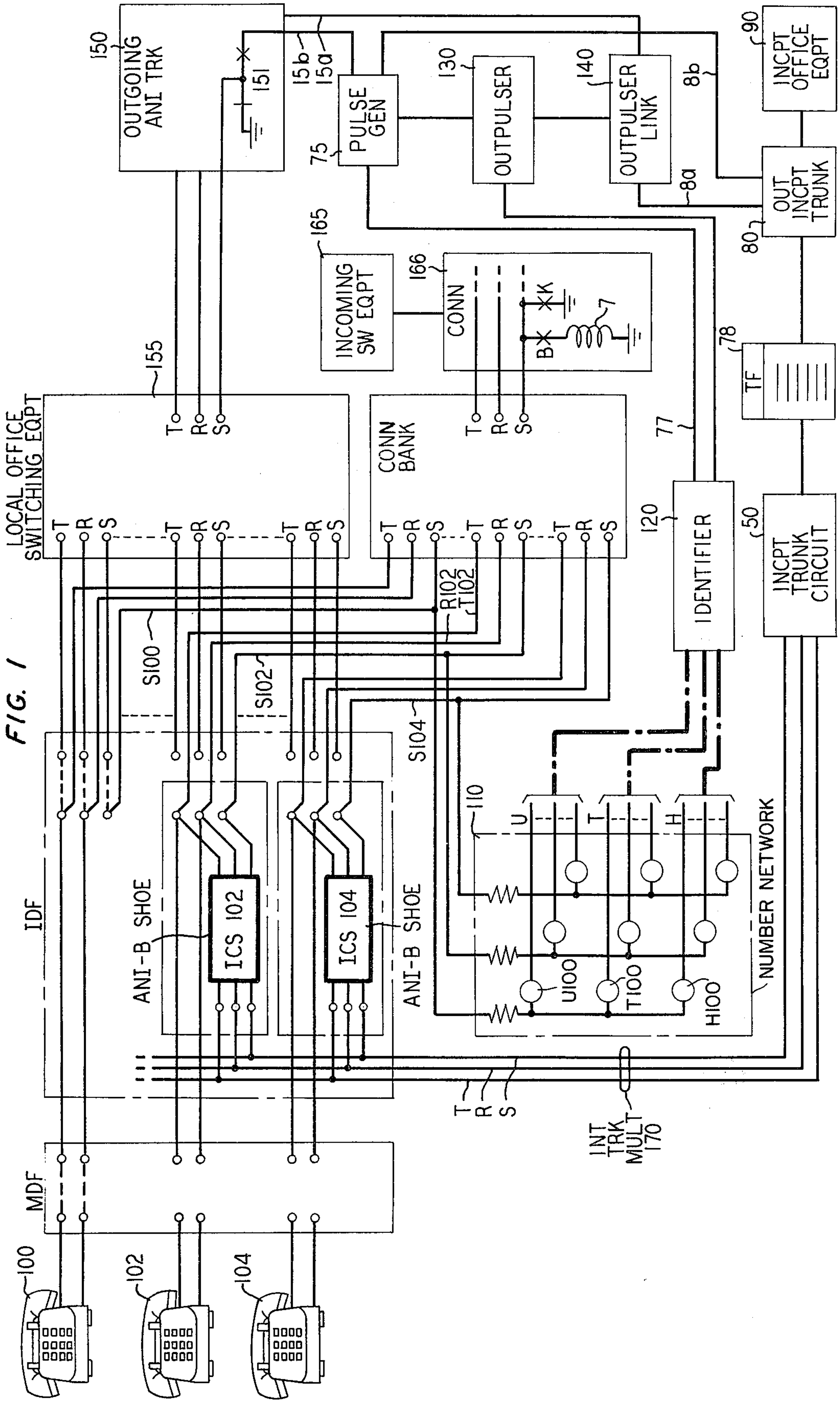
FIG. 1 shows a telephone central office employing the automatic number identification arrangement of the present invention.

It will be noted that FIG. 1 employs a type of notation referred to as "detached contact" in which an "X" shown intersecting a conductor represents a normally open contact of a relay and a bar shown intersecting a conductor at right angles represents a normally closed contact of a relay, "normally" referring to the unoperated condition of the relay. The principles of this type of notation are described in an article entitled "An Improved Detached Contact Type Schematic Circuit Drawing" by F. T. Meyer in the September 1955 publication, *Transactions of the American Institute of The Electrical Engineers*, *Part* 1, *Communications and Electronics*, Vol. 74, pages 505–513.

DETAILED DESCRIPTION

A plurality of telephones 100, 102, 104 are shown at the left-hand side of FIG. 1 connected to main distributing frame MDF. The main distributing frame MDF provides cross-connections, indicated by dash lines between the terminal points, by means of which a particular directory number may be assigned to any telephone station. The right-hand terminals of the main distributing frame are connected to the left-hand terminals of the intermediate distributing frame IDF. The intermediate distributing frame provides cross-connections for assigning a line circuit which is part of the local office switching equipment 155 to a particular directory number and to a connector bank multiple appearance associated with that directory number. The left-hand terminals of the intermediate distributing frame IDF are wired to the banks of the connector switches and the sleeve terminal of each set of terminals is connected to number network 110 for automatic number identification.

Operation of ANI System

According to the conventional use of number networks, as disclosed, for example, in the abovementioned Moore-Sears Patent, the directory number of a telephone originating a call is obtained by a CAMA office (not shown) returning a request signal through outgoing ANI trunk 150. This signal is received by outgoing ANI trunk 150 which, by means of lead 15*a*, causes outpulser link 140 to assign an outpulser 130 to the trunk. Outpulser 130 seizes identifier 120. The identifier grounds lead 77 to pulse generator 75 which is connected to outgoing ANI trunk 150 by lead 15*b*. Incident to the request from the CAMA office, outgoing ANI trunk 150 operates transfer contacts 151 (windings not shown) and transfers the sleeve lead holding path for holding the switching train of originating equipment 155 to lead 15*b*. Pulse generator 75 superimposes a pulse identifying signal on the sleeve holding path. This identifying pulse signal which has an amplitude of approximately 340 volts and a duration of about 150 microseconds, is extended back over the sleeve conductor of local office switching equipment 155 to the intermediate distributing frame IDF. Assuming telephone 100 to be a calling telephone, the identifying signal would appear at sleeve lead S100 at the intermediate distributing frame. Sleeve lead S100 is connected to number network 110 which couples the identifying signal to the particular H. T. and U buses indicating the directory number assigned to station 100. Identifier 120 comprises groups of lamps with each lamp group individually interconnected with a particular sleeve lead. A group of lamps has at least three lamps H, T and U. Each lamp is individually coupled to the H, T and U buses which are connected to identifier 120. Thus, for example, an identifying pulse appearing on sleeve lead S100 would energize lamps H100, T100 and U100. When the individual lamps are energized, a positive pulse appears on the coupled H, T, and U's buses thereby indicating the directory number assigned to station 100. It should be noted that no other group of lamps are energized since the identifying pulse signal appears only on sleeve lead S100 and on no other sleeve lead. The appearance of the identifying signal on these buses results in identifier 120 furnishing outpulser 130 the directory number information concerning station 100.

It is thus seen that in the normal operation of the automatic number identification apparatus, it is the local office switching train 155 which provides a unique path for the identifying signal from lead 15*b* to the terminal of the number network.

Combined Operation of ANI and Intercept Systems

In accordance with the principles of the present invention, it is desired to use for intercept identification purposes the same number network 110 as is used in obtaining directory number information for originating calls. However the number network will now be used to obtain the directory number assigned to intermediate distributing frame terminals to which calls are placed, rather than to those terminals which are being used to originate calls. Accordingly, the operation of the incoming switching equipment 165 will now be described. On a call to a telephone station, 100 for example, incoming switching equipment 165 operates in the normal manner to select and operate connector 166 to the connector bank multiples corresponding to the terminals of telephone 100. Since telephone 100 is assumed to be a normally operating telephone, cross-connections are present both at main distributing frame MDF and at intermediate distributing frame IDF. Connector 166 makes a busy test of the sleeve terminal, and assuming telephone 100 to be idle, operates relay K which applies ground to the sleeve terminal to hold switching train incoming switching equipment 165.

Let it be assumed that stations 102 and 104 are unavailable for service because their directory numbers are awaiting reassignment. If a call is nevertheless made to these directory numbers, it is necessary to apprise the calling party that he has reached a telephone whose directory number has been changed. In accordance with the principles of the present invention, intercept connector shoes ICS102 and ICS104 are inserted between the left-hand intermediate distributing frame terminals associated with lines 102 and 104 and one of the multiple terminals of common intercept trunk mult 170.

Inasmuch as telephones 102 and 104 are unavailable for service, the cross-connections which would otherwise be present between their left and right-hand terminals, on main distributing frame MDF and intermediate distributing frame IDF, are removed. In order to apprise the calling party who has called the directory number formerly assigned to station 104 that the person he desires to reach has been assigned a new number without it being required to ask the calling party what number he dialed, it is necessary to obtain automatically the directory number of the terminals actually reached by connector 166 and to transmit this information to the intercept office 90.

The directory number of a called line placed on intercept is obtained as follows. When contacts K of connector 166 are operated incident to the busy test of the called line, ground is applied to sleeve S104. Intercept connector shoe ICS104 contains thyristor circuitry which connects the sleeve terminal of the intermediate distributing frame appearance of line 104 to one of the sleeve lead terminals of intercept trunk multiple 170. Intercept trunk multiple 170 has multiple appearances of the tip and ring and sleeve conductors of intercept trunk circuit 50 connected at the distributing frame IDF. Intercept trunk circuit 50 advantageously may comprise a simplified version of the trunk 50 as described in A. E. Joel, Jr., U.S. Pat. No. 3,143,601 mentioned above and need not contain the ITR-relays therein described. Intercept trunk circuit 50 is seized by the extension of a call to the connector bank terminals of any of stations 102 or 104 connected to intercept trunk multiple 170.

The low resistance d.c. ground applied at connector 166 through make contact B and coil 7 forward biases the diode shunting the thyristor network. This ground seizes the trunk circuit 50 and calls trunk finder 78 into operation. This ground path may be traced from ground, coil 7 and make contact B in connector 166, to sleeve S104 of the connector bank multiple, the sleeve terminal assigned to line 104 in distributing frame IDF of intercept connector shoe ICS104, the sleeve of intercept trunk multiple 170, to battery through a relay coil in intercept trunk circuit 50. Although battery is applied to one end of each of the thyristor circuits connected to the intercept trunk multiple, only the one thereof which has resistance ground applied to its other end by connector 166 will be rendered conductive.

The B contact in connector 166 is operated during the identification sequence so as to connect a high impedance ground, comprising low resistance and high inductive component coil 7, on the sleeve lead to be identified. When the identification sequence is completed the K contact is operated to hold a low resistance ground on the sleeve lead during the remainder of the progress of the call and the B contact is released.

Trunk finder 78, called into operation by the seizure of intercept trunk circuit 50, is associated with outgoing intercept trunk 80 which, in turn, provides a path to intercept office 90 which advantageously may serve a number of different telephone offices. When a connection is established to outgoing intercept trunk 80, outpulser link 140 is seized by this trunk over lead 8*a* in the same manner that link 140 was seized by outgoing ANI trunk 150. Outpulser link 140, in turn, seizes outpulser 130, which seizes identifier 120. The latter activates pulse generator 75 which applies the d.c. identification signal to outgoing intercept trunk 80 over lead 8*b*. The identification signal is normally 340 volts in amplitude and 150 microseconds in duration.

Through the operation of trunk finder 78 a signalling path for the identifying signal is provided from outgoing intercept trunk 80 to intercept trunk circuit 50 and the sleeve of intercept trunk multiple 170. Since only one shoe circuit has been rendered conductive by ground in connector 166 and battery in intercept trunk circuit 50, the identifying signal is provided with a unique path to the distributing frame terminal of the number network belonging to the line selected by connector 166.

Number network 110 decodes the d.c. signal to provide identifier 120 with the directory number of the terminals to which connector 166 has established a connection. Identifier 120 forwards this information to outpulser 130 and the latter outpulses the directory number of the called line to the intercept office 90 through the outpulser link 140 and outgoing intercept trunk 80.

Thyristor Circuitry Operation

Figure 2:
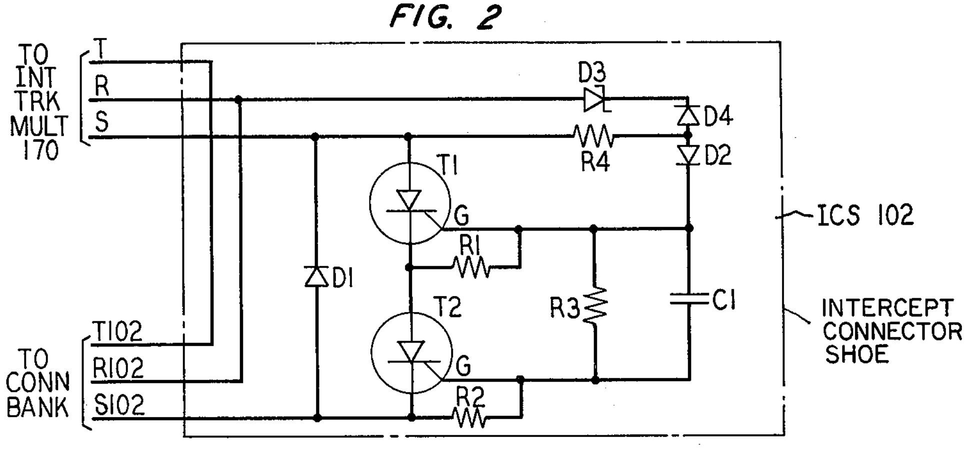
FIG. 2 is a schematic circuit drawing of the intercept connector shoe shown in FIG. 1.

FIG. 2 represents a detailed circuit view of an intercept connector shoe, for example, ICS102 which connects the T, R and S leads associated with intercept trunk multiple 170 with the T102, R102 and S102 leads respectively, associated with the connector bank. T1 and T2 of ICS102 are two thyristors having their gate circuits connected by a parallel resistor-capacitor combination comprising C1 and R3. The anode of thyristor T1 is connected with the S lead associated with the intercept trunk multiple 170, and the cathode of thyristor T2 is connected with lead S102 associated with the connector bank.

During the identification signal interval described above, ground is connected to the R lead by the intercept trunk circuit 50. Thus, the voltage associated with the identification pulse, which is applied to the S lead, appears reduced in amplitude across Zener diode D3. This reduced voltage also appears across diode D2 and on gate leads G to thyristors T1 and T2. As described above, the S102 lead has been previously connected at connector 166, FIG. 1, through a B contact and coil 7 to ground. Therefore, a gate to cathode current will be produced at thyristors T1 and T2 which will switch both thyristors on. The identification pulse which originally appeared at lead S associated with the intercept trunk multiple 170 is now passed through intercept connector shoe 102 to lead S102 which, in turn, is connected, as discussed with respect to FIG. 1, with the identifier 120. It is to be noted that although the identification pulse appears at all the shoes connected with the intercept trunk multiple 170, only the one shoe, in the above example ICS102, which has the S102 lead connected to ground through the B contact and coil 7 at connector 166 will be turned on. All the other shoes will not pass the identification pulse.

During the progress of a normal intercepted call, ringing voltage appears on lead R. Diodes D2 and D4 isolate this voltage from the thyristor gates.

Resistor R4 is a limiting resistor for Zener diode D3 and resistors R1 and R2 are biasing resistors associated with thyristors T1 and T2, respectively.

Return "Busy"

While for the sake of simplicity only one incoming switching train connector 166 has been shown in FIG. 1, it will be appreciated that a plurality thereof are provided in telephone central offices. On occasion it may happen that after the illustrated connector has made connection to the terminals of line 104, and while intercept trunk circuit 50 is thus in use, another connector (not shown) associated with incoming equipment 165 may attempt to seize the same intercept trunk. This might occur, for example, if a call were attempted to be made to intercepted line 102 while trunk circuit 50 were already in use on a call to intercepted line 104.

The circuitry for preventing this will now be discussed. It will be recalled that when connector 166, FIG. 1, sought out the connector bank terminals of line 104, a busy test was made. Circuitry (not shown) in connector 166 responds in the conventional manner to the presence of battery potential on sleeve lead S104 to permit connector 166 to operate contact B and thereby apply switch train holding ground through operated B contact and coil 7 to incoming equipment 165. This switch train holding ground is conveyed by diode D1, FIG. 2, to the sleeve lead S of intercept trunk multiple 170. Accordingly, when the above-mentioned "other" connector attempts to seize the terminals of line 102, ground rather than intercept trunk 50 battery is on the sleeve lead of intercept trunk multiple 170. Thyristors T1 and T2 of ICS102 connected with the "other" connector will be rendered conductive by the combination of ground on the sleeve lead of intercept trunk multiple 170 and the busy test potential applied by this "other" connector. Since conductive thyristors T1 and T2 cause ground to appear on the sleeve lead S102 of the "other" connector via excited thyristors T1 and T2, and the S lead of intercept trunk multiple 170, the line tests busy thereby preventing its seizure. When the connector is disconnected, the thyristors turn off. Busy tone is returned to the calling subscriber but this busy tone actually indicates a "false busy"; the telephone line associated with the dialed directory number is not busy, the intercept trunk circuit 50 is busy.

"Rate Effect"

As described above, a thyristor, for example T1 or T2, FIG. 2, is a three-terminal device which acts as a unidirectional switch between two terminals, anode and cathode, with the third terminal, the gate, acting as a control lead. Sufficient gate-to-cathode current flow causes the anode-cathode to turn on. In the off state, the anode-cathode forward breakover voltage with no gate cathode current is on the order of several hundred volts. However, a phenomenon termed "rate effect," caused by rapidly changing anode-to-cathode voltage, can improperly turn on a thyristor. Rate effect is described at page 6 of the textbook entitled "The Thyristor and Its Applications," by Anthony Griffin and R. S. Ramshaw, Chapman and Hall, Ltd., London, England.

Figure 3:
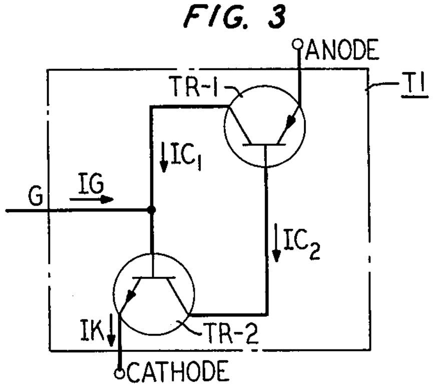
FIGS. 3, 4 and 5 show analogous thyristor circuits.

Thyristors are four-layered PnPn devices which can be modeled as two transistors, TR1 and TR2, interconnected as shown at FIG. 3. The current introduced into the circuit configuration at the gate terminal G designated IG at FIG. 3 controls the anode-to-cathode breakover voltage. The thyristor also comprises an inherent capacitor shown as Ct at FIG. 4 connected between the collectors of the transistors TR1 and TR2 which comprise thyristor T1. If the rate of application of voltage to thyristor T1 causes a sufficiently large pulse of rate current to flow through capacitor C*t*, thyristor T1 breaks down and becomes conductive. Thus the device is improperly turned on by the rate of voltage applied rather than by the current introduced into the gate circuit.

Figure 5:
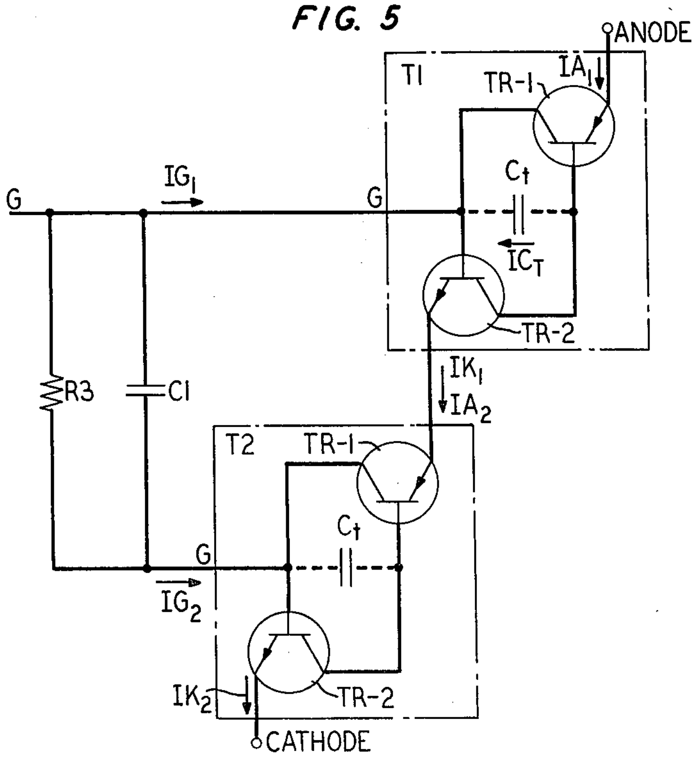

FIG. 5 illustrates an exemplary embodiment of the present invention for overcoming rate effect. FIG. 5 shows two thyristors T1 and T2 with each thyristor represented by two transistors TR1 and TR2. Also, the inherent capacitor Ct is shown for each of the thyristors. The thyristors T1 and T2 are connected in series with the cathode of thyristor T1 connected to the anode of thyristor T2. Additionally, the gate leads of each thyristor are interconnected by a parallel combination comprising capacitor C1 and resistor R3. Thus, in a situation where the rate of application of a voltage would cause a large pulse of rate effect current to flow, the arrangement shown in FIG. 5 directs the rate effect current to flow through transistor TR1 and inherent capacitor Ct associated with thyristor T1, through the G lead down through the parallel combination Cl-R3, through the G lead of thyristor T2 and out through transistor TR2 associated with thyristor T2. Thus the rate effect current flows through the top transistor, TR1, of thyristor T1 and the bottom transistor, TR2, of thyristor T2 and does not pass fully through either thyristor T1 or T2. Furthermore, the arrangement shown in FIG. 5, whereby the rate effect current goes through one transistor in each thyristor, causes a decreased rate effect current to flow which also can prevent premature firing of either thyristor T1 and T2. This decreased rate effect current will be fully analyzed below.

Analytical Discussion of "Rate Effect"

Figure 4:
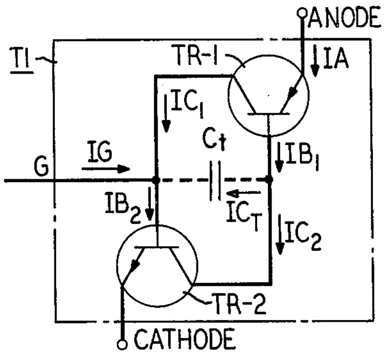

The thyristor T1 is represented by two transistors TR1 and TR2 connected as indicated in FIG. 3. FIGS. 3, 4 and 5 also show arrows indicating various current flows as will be described below.

The collector $IC_1$ and $IC_2$ for transistors TR1 and TR2 are:

$$IC_1 = \beta_1 IB_1 + (\beta_1+1)ICBO_1 \quad (1)$$

$$IC_2 = \beta_2 IB_2 + (\beta_2+1)ICBO_2 \quad (2)$$

where $\beta_1 = \beta$ characteristic of transistor $TR_1$ $\beta_2 = \beta$ characteristic of transistor $TR_2$ $IB_1$ = base current of $TR_1$ $IB_2$ = base current of $TR_2$ $ICBO_1$ = collector-base current of transistor $TR_1$ $ICBO_2$ = collector-base current of transistor $TR_2$.

Since $IB_2 = IG + IC_1$, equation (2) can be rewritten as:

$$IC_2 = \beta_2 IG + \beta_2 IC_1 + (\beta_2+1)ICBO_2 \quad (3)$$

where IG = gate current.

$IC_2$ also equals $IB_1$.

Therefore:

$$IB_1 = \beta_2 IG + B_2 B_1 IB_1 + \beta_2(\beta_1+1)ICBO_1 + (\beta_2+1)ICBO_2 \quad (4)$$

$$IB_1 = \frac{\beta_2 IG + \beta_2(\beta_1+1)ICBO_1 + (\beta_2+1)ICBO_2}{(1-\beta_1\beta_2)} \quad (5)$$

To determine the anode current IA, use $IA = (\beta_1+1)(IB_1 + ICBO_1)$ and insert equation (5) for $IB_1$.

$$IA = (\beta_1+1)\left(\frac{\beta_2 IG + \beta_2(\beta_1+1)ICBO_1 + (\beta_2+1)ICBO_2}{(1-\beta_1\beta_2)} + ICBO_1\right). \quad (6)$$

An inherent capacitor Ct connected between the collectors of the transistors as shown in FIG. 4 produces rate effect current as discussed above.

IB2 can now be given as $IB_2 = IC_1 + IG + IC_t$, where $IC_t$ = current through $C_t$. Equation (2) can be rewritten as $$IC_2 = \beta_2(IC_1+IG+IC_t) + (\beta_2+1)ICBO_1. \quad (7)$$

$$IC_2 = IB_1 - IC_t$$
$$IB_1 - IC_t = \beta_2[\beta_1 IB_1 + (\beta_1+1)ICBO_1 + IG + IC_t] + (\beta_2+1)ICBO_2 \quad (8)$$

$$IB_1 = \frac{\beta_2(\beta_1+1)ICBO_1+\beta_2 IG+(\beta_2+1)ICBO_2+IC_t(\beta_2+1)}{(1-\beta_1\beta_2)} \quad (9)$$

-continued $$IB_1 = \frac{\beta_2 ICEO_1+\beta_2 IG+ICEO_2+IC_t(\beta_2+1)}{(1-\beta_1\beta_2)} \quad (10)$$

$$IA = (\beta_1+1)(IB_1+ICBO_1) \quad (11)$$

$$IA = (\beta_1+1)IB_1 + ICEO_1.$$

Substituting Equation (10) for $IB_1$ $$IA = \frac{ICEO_1(\beta_2+1)+ICEO_2(\beta_1+1)+\beta_2(\beta_1+1)IG+IC_t(\beta_1+1)(\beta_2+1)}{(1-\beta_1\beta_2)} \quad (12)$$

If IG = 0, the rate effect current produces $$IA = \frac{ICEO_1(\beta_2+1)+ICEO_2(\beta_1+1)+IC_t(\beta_1+1)(\beta_2+1)}{(1-\beta_1\beta_2)}. \quad (13)$$

The current through the capacitor $C_t$ causes an increase in IA of $IC_t(\beta_1+1)(\beta_2+1)$ which in turn causes an increase in $\beta_1$ and $\beta_2$.

With two thyristors interconnected as shown in FIG. 5, the node equation for Thyristor-1 is:

$$IA_1 + IG_1 = IK_1 = IA_2. \quad (14)$$

Substituting Equation (12) for $IA_1$ we obtain:

$$\frac{ICEO_1(\beta_2+1)+ICEO_2(\beta_1+1)+\beta_2(\beta_1+1)IG_1+IC_t(\beta_1+1)(\beta_2+1)}{(1-\beta_1\beta_2)} + IG_1 = IK_1. \quad (15)$$

Reducing Equation (15) yields:

$$IK_1 = \frac{ICEO_1(\beta_2+1)+ICEO_2(\beta_1+1)+IG_1(\beta_2+1)+IC_t(\beta_1+1)(\beta_2+1)}{(1-\beta_1\beta_2)}. \quad (16)$$

Current $IG_1$ in the case of rate effect is in the negative direction. The practical range of values for R3 and C1 which maximize current IG in the negative direction are:

$$C1 = 10C_t \text{ to } 100C_t \text{ and } R3 < VG \div 10IG$$

where *VG* and *IG* are the triggering voltage and current respectively for the thyristor. Current $IK_1$ (16) is therefore less than for a single thyristor (13) by $IG_1(\beta_2+1)$. This smaller current also lowers $\beta_2$ in thyristor-1 producing a still further reduction in $IK_1$.

Since $IK_1 = IA_2$, the reduction in $IK_1$ reduces $IA_2$ with a corresponding decrease in $\beta_1$ of thyristor-2.

In order that a thyristor fire, the product $\beta_1\beta_2$ must approach unity for $(1-\beta_1\beta_2)$ to approach zero. This causes IA and IK to increase without bound. With the configuration in FIG. 5, I have shown that $\beta_2$ in Thyristor-1 and $\beta_1$ in thyristor-2 have decreased. It will now suffice to show that the remaining $\beta$'s remain approximately the same as FIG. 4 to indicate a reduction of the rate-effect phenomenon.

In FIG. 4 rate effect current through the capacitor exits through the base-emitter junction of transistor TR2. In FIG. 5 rate-effect current exits through the gate into the base-emitter junction of transistor TR2 of thyristor T2. The impedance to rate effect current in FIG. 5 is therefore equal to or greater than that of FIG. 4. This results in current and $\beta 1$ in thyristor T1 and current and $\beta 2$ in thyristor T2 being equal to or less than current and $\beta 1$ or $\beta 2$ of the transistors in FIG. 3.

The overall $\beta1\beta2$ product of both thyristors in FIG. 5 are less than FIG. 4 producing a reduced rate-effect.

Additional rate-effect reduction can be obtained by series interconnection of more than one FIG. 5 provided GATE-Drive for the succeeding FIG. 5 is taken from thyristor T2 of the preceding FIG. 5 through a resistor. If this is not done thyristor T1 of the top FIG. 5 and thyristor T2 of the last FIG. 5 would be utilized with all intermediate units shorted by a common gate connection. This would produce an overall rate-effect reduction comparable with a single FIG. 5.

Figure 6:
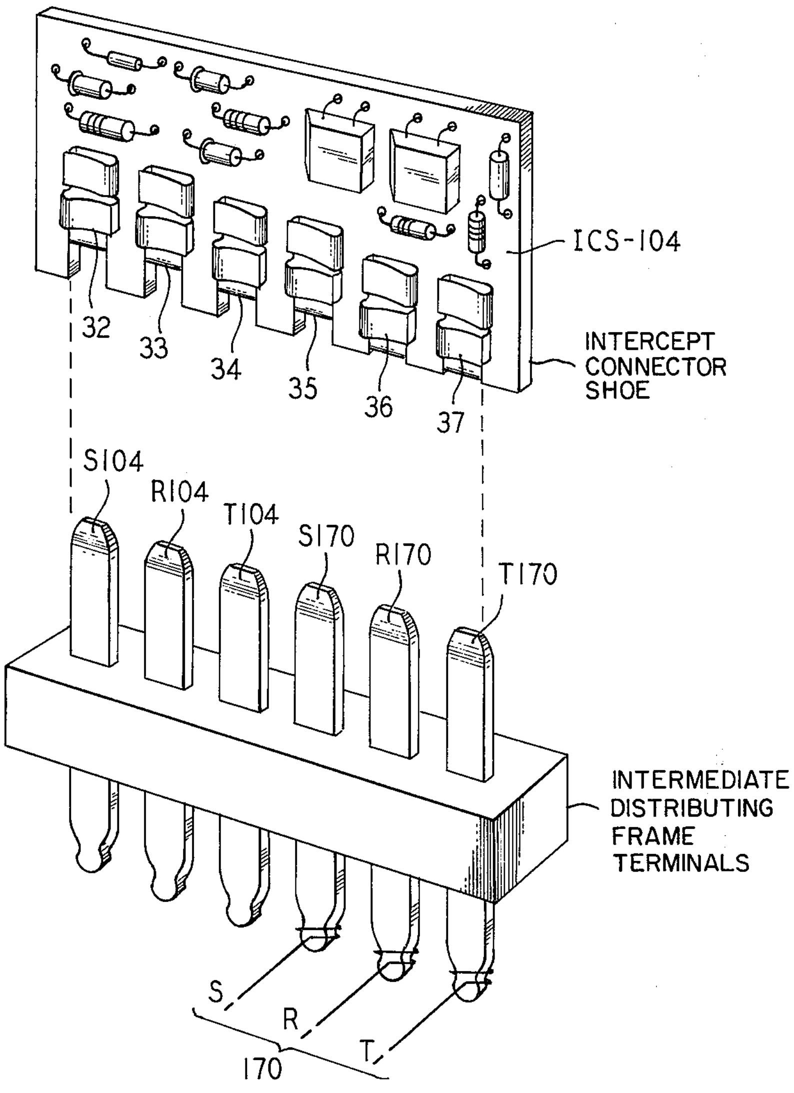
FIG. 6 shows a view of an intercept connector shoe used with the invention.

The physical structure of an illustrative embodiment of intercept connector shoe ICS104 in relationship to the terminals of the intermediate distributing frame IDF is shown in FIG. 6. For the sake of clarity, only one row of terminals of the distributing frame is depicted and the intercept connector shoe is shown lifted away from these terminals so as not to confuse the details of the shoe with those of the distributing frame itself. The tip, ring and sleeve conductors of intercept trunk multiple 170 are wired in multiple to the underside of the three rightmost terminals of each row of terminals of the distributing frame IDF. When the body of intercept connector shoe ICS104 is pushed down behind the illustrated row of terminals, clips 32, 33 and 34 engage terminals S104, R104 and T104, respectively, belonging to intercepted line 104 and clips 35, 36 and 37 engage terminals S170, R170 and T170, respectively, of intercept trunk multiple 170.

Conclusion

Although the present invention has been illustrated in a telephone office of the step-by-step type, it should be appreciated that the same principles are applicable to other switching systems, for instance, the panel type office or offices using ANI-D for identification purposes. Furthermore, it should be obvious to those skilled in the art that the aspect of the invention for overcoming "rate effect" may be applied in numerous other arrangements without departing from the spirit and scope of the invention.

What is claimed is:

1. A semiconductor switch for connecting the terminals of a nonworking telephone line with an intercept trunk multiple and arranged to pass d.c. voltage signals upon receipt of a call to said nonworking line, said switch comprising at least two thyristor devices connected in series, each of said devices having an anode electrode, a cathode electrode and a gate electrode and connecting means for connecting the gate electrode of one device with the gate electrode of the next succeeding device.

2. The invention as recited in claim 1 wherein said connecting means comprises a resistor-capacitor parallel circuit arranged such that said thyristor devices have reduced rate-effect breakdown characteristics when excited by a rapid change in the rate of anode-to-cathode voltage.

3. The invention as recited in claim 1 wherein said semiconductor switch further comprises a diode device connected between said anode electrode of said one device and said cathode electrode of said next succeeding device.

4. An intercept connector shoe for connecting the tip, ring and sleeve leads of an intercept circuit with the tip, ring and sleeve leads of a telephone terminal for a nonworking line on a call directed to said nonworking line so that d.c. voltage signals applied to said telephone terminal for the purpose of identifying said nonworking line are communicated to said intercept circuit, said intercept connector shoe comprising, a first and a second thyristor circuit wherein each thyristor circuit has an anode electrode, a cathode electrode and a gate electrode, first connecting means for connecting said anode electrode of said first thyristor with said sleeve lead of said intercept circuit, second connecting means for connecting said cathode electrode of said first thyristor with said anode electrode of said second thyristor, third connecting means for connecting said cathode electrode of said second thyristor with said sleeve lead of said telephone terminal, fourth connecting means for connecting said gate electrode of said first thyristor with said gate electrode of said second thyristor, and diode means for connecting said sleeve lead of said intercept circuit with said sleeve lead of said telephone terminal.

5. The invention as recited in claim 4 wherein said intercept connector shoe further comprises second diode means for connecting said ring lead of said intercept circuit with said sleeve lead of said intercept circuit so that a busy indication can be returned to the sleeve lead of said telephone terminal when said intercept circuit is busy.

6. The invention as recited in claim 4 wherein said fourth connecting means comprises a resistor-capacitor parallel circuit arranged such that said thyristor devices have reduced rate-effect breakdown characteristics when being excited by a rapid change in the rate of anode-to-cathode voltage.

7. In a telephone switching system, a plurality of telephone lines, a distributing frame affording an appearance thereon for each of said lines, means for generating a d.c. identification signal, number identifying means interconnected with said distributing frame appearances and operative upon receipt of said d.c. identification signal on one of said appearances for generating the directory number of the line associated with said appearance, an intercept trunk multiple, a d.c. signal directing means connected between a distributing frame appearance associated with a nonworking one of said lines and said intercept trunk multiple, means responsive to a call to said nonworking line received by said system for applying said d.c. identification signal over said intercept trunk multiple to said directing means, and thyristor circuitry in said directing means responsive to said application for rendering said directing means conductive to extend said d.c. identification signal from said intercept trunk multiple to said number identifying means.

8. The invention as recited in claim 7 wherein said thyristor circuitry further comprises a pair of thyristors, each of said thyristors having an anode electrode, a cathode electrode, and a gate electrode, first connecting means for connecting said cathode electrode of one thyristor with said anode electrode of the next succeeding thyristor, and second connecting means for connecting the gate electrode of said one thyristor with the gate electrode of said next succeeding thyristor.

9. The invention as recited in claim 8 wherein said second connecting means comprises a parallel resistor-capacitor combination.

10. The invention as recited in claim 8 wherein said d.c. signal directing element means further comprises a diode device connected between said anode electrode of said one thyristor and said cathode electrode of said next thyristor.

11. In a telephone switching system having a plurality of telephone terminals, directory number identifying means connected to said terminals and effective upon its operation for generating a directory number for each call received by said system, an intercept trunk, thyristor means individually connecting all of said terminals associated with nonworking lines to said trunk, a d.c. signal source for operating said identifying means, said d.c. source being connected to each of said thyristor means, each of said thyristor means normally isolating said d.c. source from said nonworking number line terminals, and means for activating one of said thyristor means when a received call is directed to a nonworking line associated with said one thyristor means, said one thyristor means being responsive to said activation for removing said isolation, said directory number identifying means being responsive to said isolation removal for generating the directory number of said nonworking line.

12. A semiconductor switch with reduced rate-effect breakdown characteristics having an anode, a cathode, and a gate, said semiconductor switch comprising: two thyristor devices each having an anode electrode and a cathode electrode and a gate electrode, means connecting the anode electrode of the first thyristor device with the said semiconductor switch anode, means connecting the cathode electrode of said first thyristor device to the anode electrode of the second thyristor device, means connecting the cathode electrode of said second thyristor device with the said semiconductor switch cathode, means connecting the gate electrode of said first thyristor device with the said semiconductor switch gate, and means connecting the gate electrode of said first thyristor device with the gate electrode of said second thyristor device for passage of current from the gate electrode of said first thyristor device into the gate electrode of said second thyristor device in response to rapid anode-to-cathode voltage changes across said semiconductor switch.

13. The semiconductor switch as recited in claim 12 wherein said means for current passage comprises a resistor R3 and capacitor C1 in parallel, said resistor R3 having values of:

$$R3 < VG \div 10IG,$$

where $VG$ = the gate potential (volts) necessary to trigger each of said thyristors, $IG$ = the gate current (amps) necessary to trigger each of said thyristors, and said capacitor C1 having values of:

$$C1 = 10C_t \text{ to } 100C_t$$

where $C_t$ = the inherent capacitance (farads) of each of said thyristors.

14. The method of operating a semiconductor switch with reduced rate-effect breakdown characteristics having an anode, a cathode, and a gate, said method comprising the steps of:

connecting the cathode electrode of a first thyristor to the anode electrode of a second thyristor, interconnecting said semiconductor switch anode with the anode electrode of said first thyristor, interconnecting said semiconductor switch cathode with the cathode electrode of said second thyristor, interconnecting said semiconductor switch gate with the gate electrode of said first thyristor, connecting a circuit means between the gate electrodes of said first thyristor and said second thyristor, and passing current from the said first thyristor gate electrode into the said second thyristor gate electrode through said circuit means in response to rapid changes of voltage across the anode and cathode of said semiconductor switch.

15. The method of operating a semiconductor switch with reduced rate-effect breakdown characteristics having an anode, a cathode, and a gate, said method comprising the steps of:

connecting the cathode electrode of a first thristor to the anode electrode of a second thyristor to form a series arrangement of two thyristors, interconnecting the said semiconductor switch anode with the anode electrode of said first thyristor, interconnecting the said semiconductor switch cathode with the cathode electrode of said second thyristor, interconnecting the said semiconductor switch gate with the gate electrode of said first thyristor, connecting a resistor R3 between the gate electrodes of said first and second thyristors with values:

$$R3 < VG \div 10IG,$$

where $VG$ = the gate potential (volts) necessary to trigger each of said thyristors, and IG = the gate current (amps) necessary to trigger each of said thyristors, connecting a capacitor C1 in parallel to resistor R3 between said gate electrodes with values:

$$C1 = 10C_t \text{ to } 100C_t$$

where $C_t$ = the inherent capacitance (farads) of each of said thyristors, and passing current from the gate electrode of said first thyristor into the gate electrode of said second thyristor through said R3 and C1 in response to rapid changes of voltage across the anode and cathode of said semiconductor switch.

16. A semiconductor switch with reduced rate-effect breakdown characteristics having an anode, a cathode, and a gate, said semiconductor switch comprising: two thyristors T1 and T2 each having anode and cathode and gate electrodes, a first conductive path interconnecting the said switch anode with the anode of T1, a second conductive path interconnecting the cathode of T1 with the anode of T2, a third conductive path interconnecting the cathode of T2 with the said switch cathode, a resistor R1 interconnecting the gate of T1 with the cathode of T1, a resistor R2 interconnecting the gate of T2 with the cathode of T2, a resistor R3 interconnecting the gate of T1 with the gate of T2, said resistor R3 having the values of:

$$R3 < VG \div 10IG,$$

where

VG = the gate potential (volts) necessary to trigger each of said thyristors, $IG$ = the gate current (amps) necessary to trigger each of said thyristors, a capacitor C1 connected in parallel to R3, said capacitor C1 having the values of:

$C1 = 10C_t$ to $100C_t$ where $C_t$ = the inherent capacitance (farads) of each of said thyristors, and means interconnecting the gate of T1 with the said switch gate.

17. In a telephony system with an intercept office and a local office having intercept facilities for automatically identifying the directory number of a called nonworking line, said local office facilities comprising: incoming switching equipment, an intermediate distribution frame having terminals for each line in said local office, an intercept connector shoe connected to the terminals of said nonworking line, outgoing trunk equipment, means in said incoming switching equipment responsive to the receipt by said local office of a call directed to said nonworking line for generating a busy test signal, means for applying said test signal to said intercept shoe, a first means in said shoe for extending said test signal to said outgoing trunk equipment, means in said outgoing trunk equipment responsive to said extended test signal for establishing a connection extending from said trunk equipment to said intercept office, means responsive to the establishment of said connection for applying a direct current identification signal to said shoe, means for determining the directory number of said nonworking line for said call, a second means in said shoe for extending said identification signal to said determining means, said determining means being responsive to said identification signal for generating said directory number, and means responsive to said number generation for extending said generated directory number over said connection to said intercept office.

18. The intercept facilities of claim 17 in which said first means in said shoe for extending said busy test signal comprises a diode connected between said incoming switching equipment and said outgoing trunk equipment.

19. The intercept facilities of claim 17 in which said second means in said called shoe for extending said identification signal comprises a semiconductor switch circuit connected between said determining means and said outgoing trunk equipment.

20. The intercept facilities of claim 19 in which said semiconductor switch circuit comprises two thyristor devices connected in series and a triggering circuit responsive to said identification signal application for activating said thyristors into a conductive state.

21. The intercept facilities of claim 17 in which said means in said outgoing trunk equipment for establishing a connection comprises: an intercept trunk circuit connected to said shoe, a trunk finder, trunks interconnecting said local office with said intercept office, means in said intercept trunk circuit responsive to said extended busy test signal from said shoe for seizing said trunk finder, and means in said trunk finder responsive to said seizure for establishing one of said trunks as a connection to said intercept office.

22. The intercept facilities of claim 21 in which said means for applying a direct current identification signal comprises: a pulse generator, an outpulser responsive to the establishment of said connection for seizing said pulse generator, said pulse generator being responsive to said seizure for applying a direct current identification signal over said connection and through both said trunk finder and said intercept trunk circuit to said shoe.

23. The intercept system of claim 22 in which said first means in said shoe comprises a diode circuit interconnected between said incoming switching equipment and said intercept trunk circuit and said second means in said shoe comprises a semiconductor switch circuit interconnected between said determining means and said intercept trunk circuit, said semiconductor switch being responsive to said applied identification signal for extending said identification signal to said determining means.

24. The intercept system of claim 23 in which said semiconductor switch circuit comprises two thyristor devices connected in series between said determining means and said intercept trunk circuit, and a triggering circuit responsive to the application of said identification signal for activating said thyristors into a conductive state.

25. The method of operating nonworking number intercept facilities in a telephony switching system having local and intercept offices, said method comprising the steps of:

generating a busy test signal in incoming switching equipment for a call to a nonworking line received by said local office, extending the busy test signal from said switching equipment to outgoing trunk equipment in said local office, seizing a trunk to said intercept office in response to said extended busy test signal, generating a direct current identification signal with a pulse generator in said local office in response to said seizure, extending the said identification signal from said pulse generator to a number decoder in said local office, decoding the extended identification signal into the directory number of said nonworking line, and extending said directory number from said number decoder over said trunk to said intercept office.

26. The method of claim 25 in which the step of extending the direct current identification signal further comprises:

forming a series arrangement of two thyristors, interconnecting a trigger circuit between said thyristors, impressing the said identification signal across said series thyristors and said trigger circuit, and triggering said thyristors into a conductive state.

27. The method of operating intercept facilities for automatically identifying the directory number of a called nonworking line in a telephony system having an intercept office, a local office and interconnecting trunks, said local office comprising an intermediate distributing frame having terminals for each line in said office, incoming switching equipment, and outgoing trunk equipment, said method comprising the steps of:

connecting an intercept connector shoe to the terminals of a nonworking line on said intermediate distributing frame, receiving a call directed to said nonworking line by said local office, generating a busy test signal in said incoming equipment in response to said receipt, impressing said busy test signal across said shoe, extending said impressed busy test signal from said incoming equipment through said shoe to said outgoing equipment, establishing an intercept trunk connection from said local office to said intercept office in response to said extended busy test signal to said outgoing equipment, generating a direct current identification signal in response to said connection, impressing the said identification signal across said shoe, extending the said impressed identification signal through said shoe to a number identifier, generating the directory number of said nonworking line in response to said extended identification signal by said number identifier, and extending the said generated directory number over said intercept trunk connection to said intercept office.

28. The method of claim 27 in which the step of establishing an intercept trunk connection further comprises the following steps of:

seizing an intercept trunk circuit with said extended busy test signal, seizing a trunk finder in response to said intercept trunk seizure, and finding said intercept trunk connection to said intercept office from among said trunks in response to said trunk finder seizure.

29. The method of claim 28 in which the step of generating a direct current identification signal further comprises the following steps in the order of:

seizing an outpulser link in response to said connection, seizing an outpulser, seizing an identifier, seizing a pulse generator, generating a direct current identification signal from said pulse generator, and extending said identification signal over said connection through said seized trunk finder and said intercept trunk circuit to said shoe.

30. The method of claim 29 in which the step of extending the impressed identification signal further comprises the following steps of:

forming a series arrangement of two thyristors in said shoe, interconnecting a triggering circuit between said thyristors, impressing the said identification signal across said thyristors and said triggering circuit, and triggering the said thyristors from a nonconductive state into a conductive state.

* * * * *